US009599400B2

United States Patent
Poloni

(10) Patent No.: US 9,599,400 B2
(45) Date of Patent: Mar. 21, 2017

(54) APPARATUS AND METHOD TO FEED AND PREHEAT A METAL CHARGE TO A MELTING FURNACE

(71) Applicant: DANIELI & C. OFFICINE MECCANICHE SPA, Buttrio (IT)

(72) Inventor: Alfredo Poloni, Fogliano di Redipuglia (IT)

(73) Assignee: DANIELI & C. OFFICINE MECCANICHE SPA, Buttrio (IT)

( * ) Notice: Subject to any disclaimer, the term of this patent is extended or adjusted under 35 U.S.C. 154(b) by 262 days.

(21) Appl. No.: 14/383,928

(22) PCT Filed: Mar. 7, 2013

(86) PCT No.: PCT/IB2013/000325
§ 371 (c)(1),
(2) Date: Sep. 9, 2014

(87) PCT Pub. No.: WO2013/132306
PCT Pub. Date: Sep. 12, 2013

(65) Prior Publication Data
US 2015/0153106 A1    Jun. 4, 2015

(30) Foreign Application Priority Data

Mar. 9, 2012 (IT) .............................. UD2012A0039

(51) Int. Cl.
*F27D 13/00* (2006.01)
*C21C 5/52* (2006.01)
(Continued)

(52) U.S. Cl.
CPC ............... *F27D 13/00* (2013.01); *C21C 5/00* (2013.01); *C21C 5/527* (2013.01); *C21C 5/565* (2013.01);
(Continued)

(58) Field of Classification Search
CPC .......... C21C 5/565; C21C 5/00; F27D 17/002
(Continued)

(56) References Cited

U.S. PATENT DOCUMENTS

| 6,024,912 A * | 2/2000 | Wunsche | C21O 5/565 |
| | | | 266/156 |
| 6,696,013 B2* | 2/2004 | Wunsche | C21B 11/08 |
| | | | 266/142 |
| 2015/0153106 A1* | 6/2015 | Poloni | C21O 5/527 |
| | | | 266/44 |

FOREIGN PATENT DOCUMENTS

| EP | 0291701 A1 | 11/1988 |
| EP | 1034313 A1 | 9/2000 |

(Continued)

OTHER PUBLICATIONS

PCT Search Report dated Jun. 20, 2013 of Patent Application No. PCT/IB2013/000325 filed Mar. 7, 2013.

*Primary Examiner* — Scott Kastler
(74) *Attorney, Agent, or Firm* — Maine Cernota & Rardin

(57) ABSTRACT

An apparatus to feed and pre-heat a metal charge to a melting furnace of a steelworks comprises a feeding and pre-heating tower separate from the melting furnace provided with at least one compartment to temporarily contain said metal charge, transfer means to transfer said metal charge to said melting furnace and conveying means to convey the fumes exiting from the melting furnace to said compartment. The apparatus also comprises a post-combustion chamber, disposed adjacent to and below said compartment, and connected on one side to said compartment and on another side to said conveying means, the post-combustion chamber being configured to determine the expansion of the fumes introduced by the conveying means and to direct said expanded fumes toward said compartment along a path such as to determine a desired residence time of said fumes (Continued)

suitable to obtain at least the substantial complete combustion of the unburned gases present in said fumes.

17 Claims, 5 Drawing Sheets

(51) Int. Cl.
*C21C 5/56* (2006.01)
*F27B 3/18* (2006.01)
*C21C 5/00* (2006.01)
*F27D 3/00* (2006.01)
*F27D 17/00* (2006.01)

(52) U.S. Cl.
CPC ............... *F27B 3/186* (2013.01); *F27D 3/00* (2013.01); *F27D 13/002* (2013.01); *F27D 17/002* (2013.01); *Y02P 10/216* (2015.11)

(58) Field of Classification Search
USPC ........................................... 266/144
See application file for complete search history.

(56) References Cited

FOREIGN PATENT DOCUMENTS

| | | |
|---|---|---|
| JP | 61015908 A | 1/1986 |
| JP | 2002031487 A | 1/2002 |

* cited by examiner

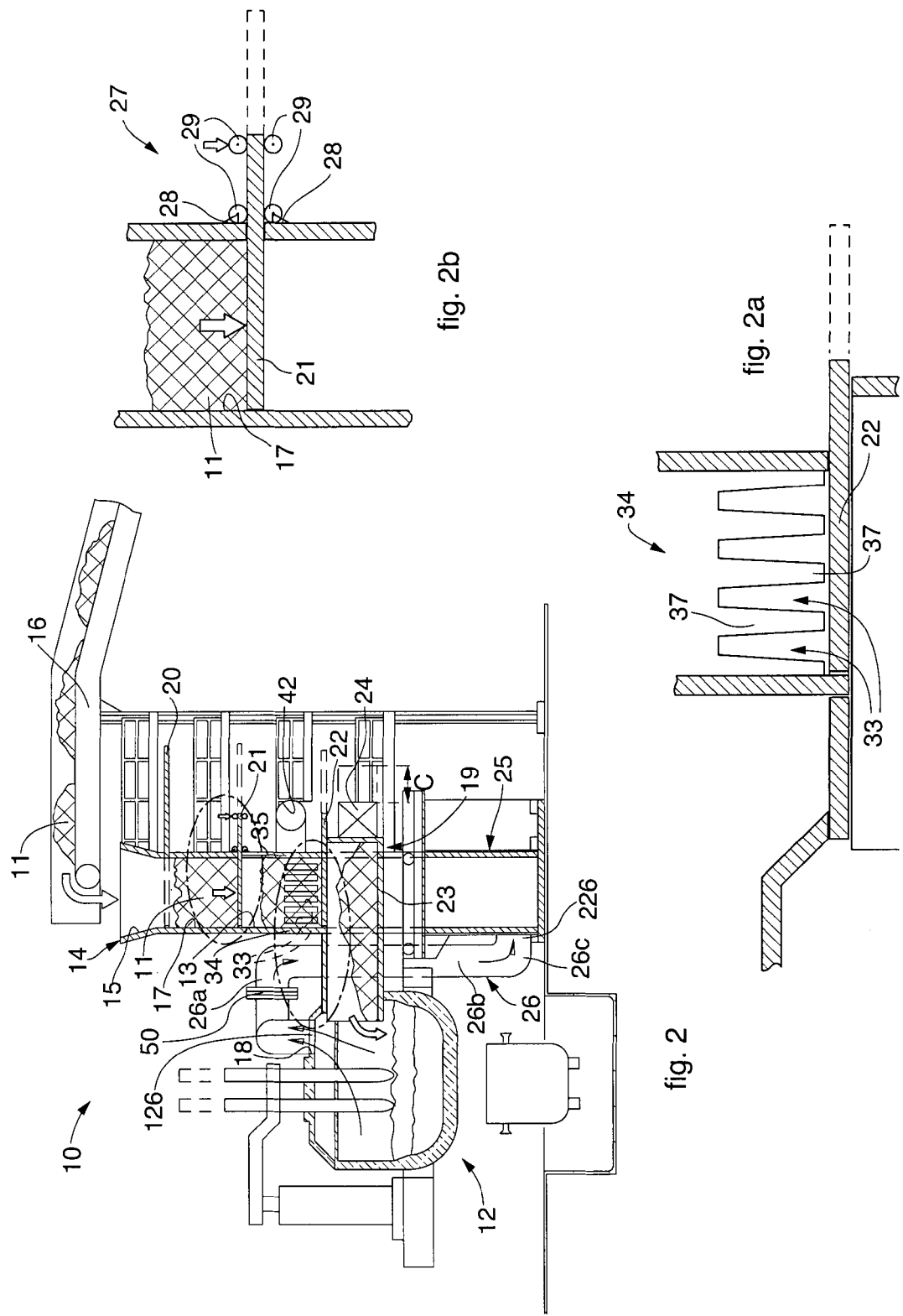

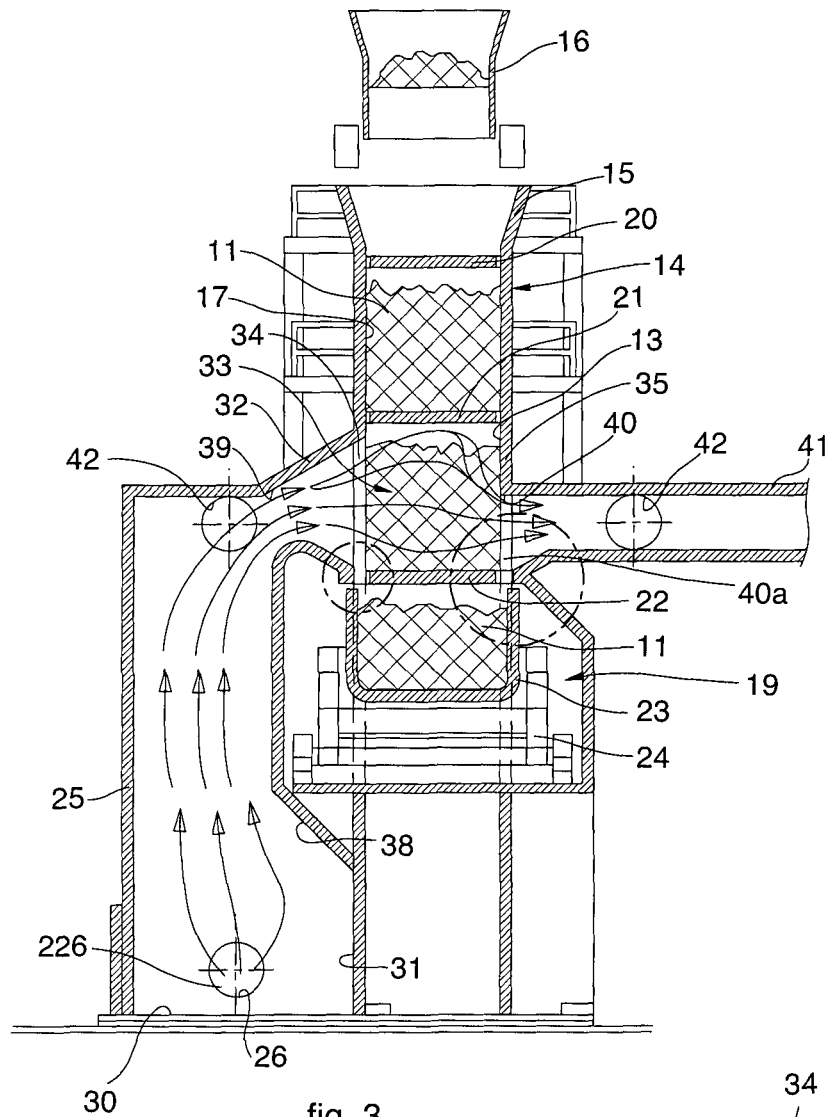
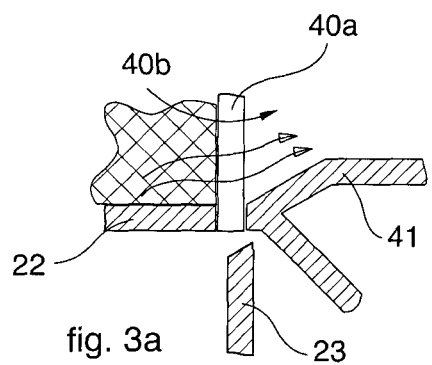
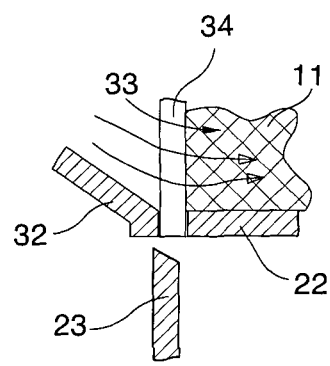

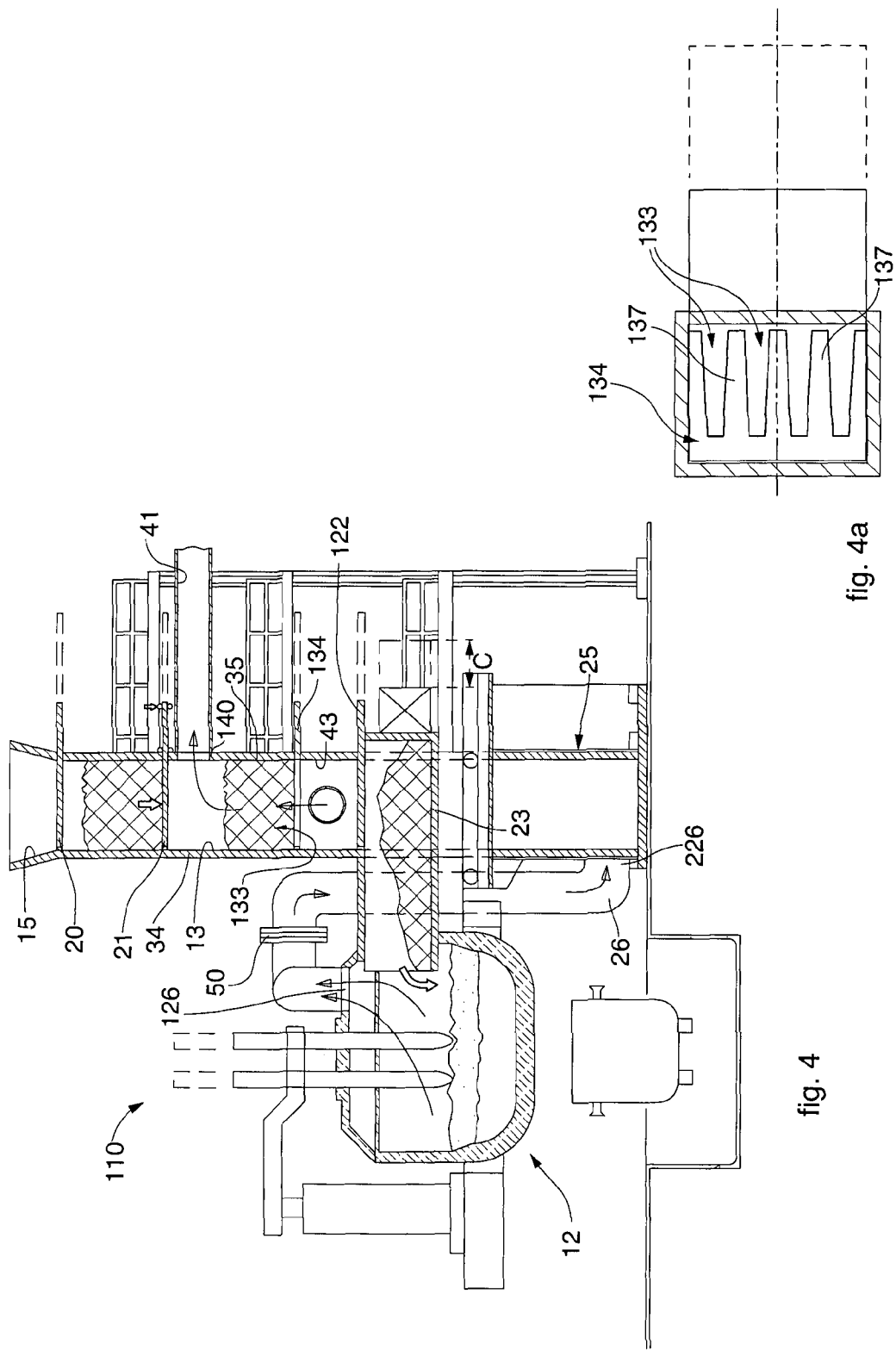

APPARATUS AND METHOD TO FEED AND PREHEAT A METAL CHARGE TO A MELTING FURNACE

FIELD OF THE INVENTION

The present invention concerns an apparatus and the corresponding method to feed and pre-heat a metal charge to the melting furnace of a steelworks.

BACKGROUND OF THE INVENTION

Apparatuses are known, for feeding a metal charge to the melting furnace of a steelworks. Before being fed to the furnace, the metal charge or scrap is normally pre-heated by means of the fumes produced by the melting of the metal.

Some known apparatuses provide a feeding and pre-heating tower for the scrap, integrated with the furnace and disposed directly above it, such as for example in the solution shown in JP 61 015908 A, so that the scrap is discharged from above directly into the liquid bath, with obvious problems, given the quantities of metal charge fed on each occasion, even 40 tonnes, of splashing of the liquid bath and slag, given the height, even 4-5 meters, from which the metal charge is discharged, and also problems of transmission of knocks and vibrations from the tower to the furnace during these steps.

Other apparatuses, known for example from EP-B-1.153.144 and the patent application CA-A-2,222,401 (corresponding to EP 1.034.313), comprise a tower to feed the scrap that is outside and separate from the melting furnace. In this case, for the purposes of pre-heating, the fumes exiting from the furnace are conveyed to the top of the tower where they enter, from the top downward, in the same direction as the scrap to be pre-heated.

In particular, the fumes exit from the melting furnace by means of a pipe that is connected to the top of the pre-heating tower, in which there is also an aperture for the introduction of the scrap using buckets. Selective opening means allow the scrap to progressively descend toward the central part of the tower, where there is the conveyor system that transports the scrap, pre-heated by the fumes that also descend from the upper part to the lower part of the tower, inside the furnace. The fumes continue their descent toward the bottom of the pre-heating tower, where there is a post-combustion chamber.

These known apparatuses have the main disadvantage, however, that the early contact of the fumes with the scrap, given their short journey, does not give the necessary time for completing the combustion of the fumes, which therefore, when they come into contact with the metal charge, are still rich in carbon monoxide because it has not been completely combusted into carbon dioxide. This causes, first of all, the risk of explosions in the metal charge with the danger of compromising the functionality of the process, the integrity of the plant and the safety of the workers. Furthermore, after the pre-heating step there is a presence of carbon monoxide in the fumes directed to the flue, which entails more risks of explosions along the pipes and also the need to provide appropriate and costly systems to remove the carbon monoxide before the fumes are introduced into the atmosphere, since carbon monoxide is notoriously a dangerous and toxic pollutant.

Another disadvantage of known devices is that the metal charge is put in contact with the fumes when they are still very hot, and this risks causing the small-size components of the metal charge and the components that melt at low temperatures to melt already in the first part of the feed tower.

If this melting occurs in the zone where the metal charge is introduced inside the electric furnace, compact blocks are formed that cause blockages in the conveyor pipe, with consequent long and complex interventions to reactivate the plant.

Another disadvantage of known apparatuses is that the fumes which hit the metal charge directly at high temperature, comprised between about 1,200° C. and about 1,350° C., cause high levels of oxidation of the metal charge. The oxidation reduces the yield of the metal charge and frustrates the beneficial effect of recovering the energy of the fumes, since a greater electric energy is required in order to melt the oxidized metal charge in the furnace.

Moreover, the high losses of load that affect the fumes along their path inside the pre-heating chamber have the disadvantage of requiring apparatuses to be installed that have greater power, so as to induce the motion of the fumes from the chamber to the exit flue.

One purpose of the present invention is to obtain an apparatus to feed and pre-heat the metal charge intended for the melting furnace of a steelworks, which pre-heats the metal charge uniformly, exploiting the energy of the fumes exiting from the melting furnace, which fumes, before hitting the metal charge, are processed in order to burn all the carbon monoxide and to remove the particulate present therein.

Another purpose of the present invention is to obtain an apparatus to feed and pre-heat a metal charge which allows to prevent, or at least to limit, the oxidation or melting, even only partial, of the metal charge and which allows to recover energy advantageously in the range of 60-70 kWh/t.

Another purpose of the present invention is to supply a compact apparatus that is not expensive from a construction point of view, and which allows to reduce the expenditure of energy needed to carry out the steel-making processes.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, an apparatus according to the present invention is used to feed and pre-heat a metal charge to a melting furnace of a steelworks.

The apparatus comprises a feeding and pre-heating tower separate from, and disposed at the side of, the melting furnace, and is provided with at least one compartment to temporarily contain the metal charge, transfer means to transfer the metal charge to the melting furnace and conveying means to convey the fumes exiting from the melting furnace to the compartment containing the metal charge, in order to pre-heat the metal charge.

The apparatus also comprises a post-combustion chamber, disposed below the compartment. According to a characteristic feature of the present invention, the fume conveying means are connected with a first end to the fume exit hole of the melting furnace, and with a second end to the post-combustion chamber, the post-combustion chamber being configured to determine the expansion of the fumes introduced by the conveying means and to direct the expanded fumes toward the compartment containing the metal charge. The path of the fumes thus created, thanks to which the fumes pass through the post-combustion chamber before coming into contact with the metal scrap to be pre-heated, has a length such as to determine a desired residence time suitable to obtain at least the substantial complete combustion of the unburned gases present in the fumes.

According to one form of embodiment of the present invention, the residence time is comprised between about 1 and 2 seconds, and in any case suitable to complete the combustion of the carbon monoxide, CO, into carbon dioxide $CO_2$. The post-combustion prevents the risk of explosions inside the metal charge, increasing the safety of the process, and eliminates the need to provide downstream complex and costly apparatuses to remove the carbon monoxide before the fumes are introduced into the atmosphere. According to one solution of the invention, the post-combustion chamber is configured to also determine the sedimentation of the particulate and powders contained in the fumes.

In this way, the particulate is prevented from entering into the metal charge and blocking part of the passage of the fumes through the charge, thus obtaining a better heat yield. Moreover, the temperature of the fumes inside the post-combustion chamber is reduced from about 1,200° C.-1, 350° C. to about 800-900° C., with the advantage of greatly limiting the oxidation of the metal charge and therefore less energy is expended for melting the charge in the melting furnace.

In one form of embodiment, the post-combustion chamber is disposed adjacent to, that is, at the side of and not directly below, the compartment of the tower containing the metal charge to be loaded into the furnace. This solution allows to obtain a longer residence time of the fumes compared with a solution with a post-combustion chamber disposed directly below the compartment containing scrap, in order to obtain the advantages indicated above. This solution also allows a greater freedom in modulating the residence time, for example creating obligatory paths for the fumes that can be selectively activated if particular temperature detections and/or the presence of scrap were to indicate the need for a longer or shorter residence time of the fumes before they contact the scrap.

In a first form of embodiment, the compartment of the feeding tower containing the metal charge has lateral apertures able to cooperate at least with the exit of the post-combustion chamber, to allow the fumes to enter the compartment, advantageously provided also to allow the fumes to exit from the compartment, once the pre-heating of the scrap has taken place.

In a variant of the first form of embodiment, the compartment containing the metal charge has at least one, preferably two, lateral walls configured as grids, which define the lateral apertures for the entrance and advantageously also the exit of the fumes into/from the compartment.

In another variant of the first form of embodiment, the compartment containing the metal charge has at its lower part mobile shutter means that, in a closed condition, support the metal charge and, in an open condition, allow it to be discharged to the transfer means.

In one variant, at least the shutter means are configured to pass from the closed condition to the open condition so as to allow a gradual and progressive discharge of the metal charge from the compartment to the transfer means.

In a second form of embodiment, the compartment of the feeding tower containing the metal charge has lower apertures able to cooperate with the exit of the post-combustion chamber, in this case too so as to allow the fumes to enter the compartment.

In a variant of the second form of embodiment, the compartment containing the metal charge comprises at its lower part mobile shutter means that have the lower apertures and that, in a closed condition, support the metal charge and, in an open condition, allow it to pass to the transfer means. In a variant, the mobile shutter means are configured as grids that define the lower apertures.

In variants of the second form of embodiment, the fumes exit from the compartment, after the scrap has been pre-heated, through a suitable upper aperture of the same compartment, which cooperates with a fume discharge pipe.

According to one form of embodiment, the tower comprises temporary separation means, such as a shutter device, or in general a mobile wall, between the compartment and the transfer means, to supply pre-determinable discrete quantities of metal charge to the transfer means.

According to another form of embodiment, the transfer means are configured to be driven in continuous advance, preferably at variable speed, determining the continuous and controlled transfer of the quantities of metal charge supplied to it on each occasion.

The present invention also concerns a method to feed and pre-heat a metal charge to a melting furnace of a steelworks, which provides to temporarily contain the metal charge in a compartment of a feeding tower outside the melting furnace, to transfer the metal charge to the melting furnace and to convey the fumes exiting from the melting furnace to the compartment, in order to pre-heat the metal charge.

According to the method of the present invention, before coming into contact with the scrap, the fumes exiting from the melting furnace are conveyed to a lower part of the tower, into a post-combustion chamber disposed below the compartment, in which a post-combustion step is carried out on the fumes which allows to expand the fumes introduced into the post-combustion chamber, from which they are then directed toward the compartment, containing the metal charge, of the tower, after having followed a path such as to determine a desired residence time of the fumes in the post-combustion chamber suitable to obtain at least the substantial complete combustion of the unburned gases, particularly carbon monoxide, present in the fumes.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 2 is a section view from II to II of FIG. 1;
FIG. 2a is an enlarged detail of FIG. 2;
FIG. 2b is another enlarged detail of FIG. 2;
FIG. 3 is a section view from III to III of FIG. 1;
FIG. 3a is an enlarged detail of FIG. 3;
FIG. 3b is another enlarged detail of FIG. 3;
FIG. 4 is a variant of FIG. 2;
FIG. 4a is an enlarged detail of FIG. 4.

DESCRIPTION OF SOME FORMS OF EMBODIMENT OF THE INVENTION

Figure 1:
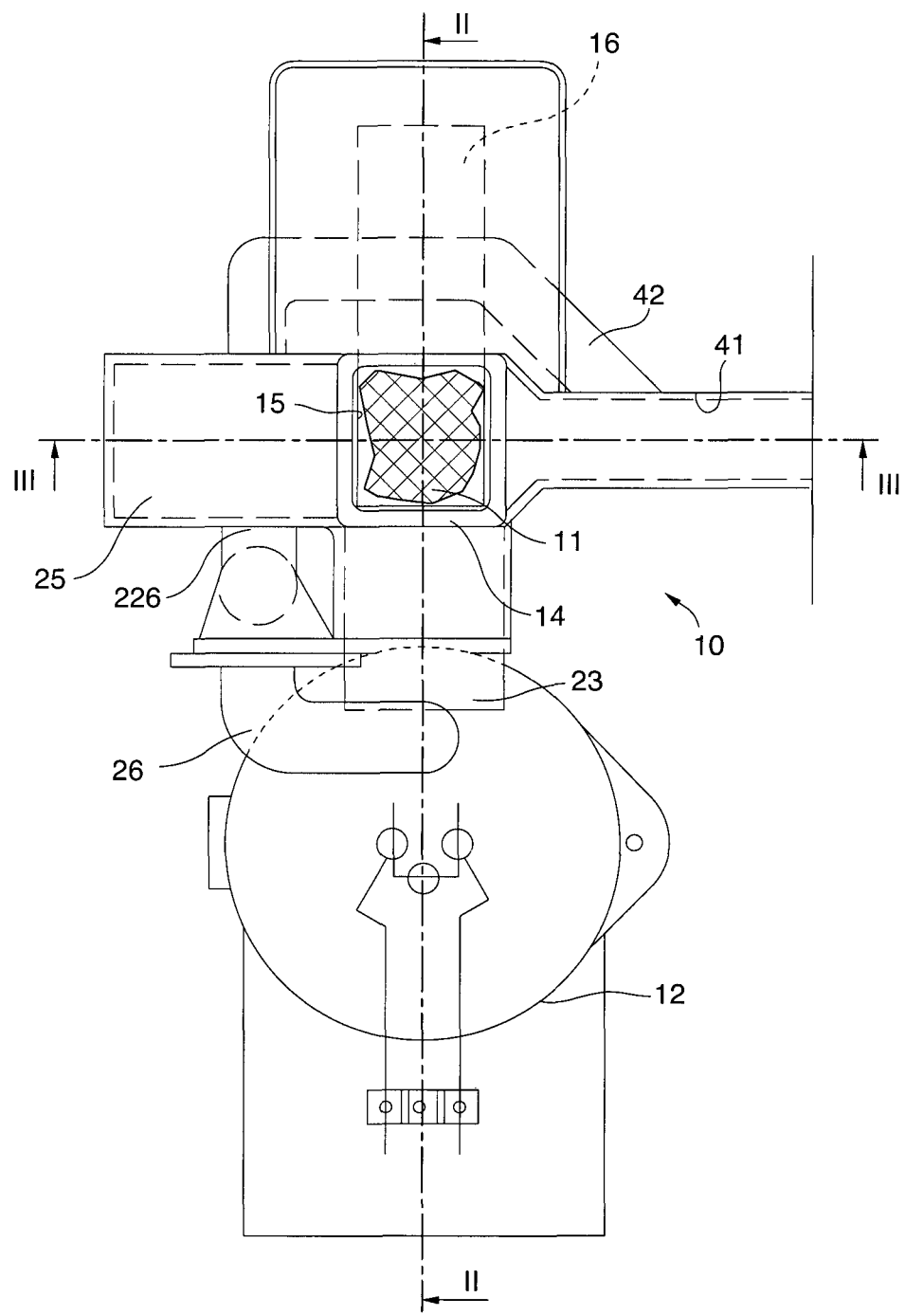
FIG. 1 is a schematic top plan view of an apparatus according to the present invention associated with a melting furnace.

With reference to FIGS. 1, 2 and 3, an apparatus 10 according to the present invention is used to feed and pre-heat a metal charge 11, or scrap, to a melting furnace 12 of a steelworks, for example having a capacity of 100-120 t/hr.

The apparatus 10 comprises a tower 14 to feed and pre-heat the metal charge 11, with a vertical development, which is disposed at the side of and separate and autonomous from the melting furnace 12. In this way the vibrations and/or knocks originating from the tower 14 are discharged onto its own support plane 30 and onto the foundations, and not onto the melting furnace 12.

Furthermore, the apparatus 10 comprises fume conveying means to convey the fumes exiting from the melting furnace 12 to direct them toward a compartment 13 in order to pre-heat the metal charge 11.

In this case, the conveying means comprise a first pipe 26 to transport the fumes, which comprises a first end 126 connected to an exit hole 18 of the melting furnace 12; the fumes are directed through the first pipe 26, and as will be described hereafter in more detail, toward the tower 14 to pre-heat the metal charge 11.

The tower 14 is configured to operate with discrete and sequential quantities of metal charge 11, that are fed to the head of the tower by means of a feed device 16, such as for example a rolling shutter transporter, which provides a discontinuous feed of the metal charge 11, in discrete charges of about 10-30 tonnes each.

The tower 14 comprises means 19 to transfer the metal charge 11 to the melting furnace 12. The transfer means 19 are configured to operate with a substantially continuous movement, receiving on each occasion the discrete quantity of metal charge 11 from the compartment 13 and transporting it to the melting furnace 12.

The tower 14 comprises a feed chamber 15 located in its top part or head, inside which the metal charge 11 arriving from the feed device 16 is introduced. The metal charge 11 is then transferred due to gravity to an intermediate chamber 17, below the feed chamber 15, by opening a first shutter device 20.

The tower 14 also comprises the pre-heating compartment 13, disposed below the intermediate chamber 17 and above a part of the conveyor channel 23. The compartment 13 is selectively separated from the intermediate chamber 17 above it by a second shutter device 21.

The metal charge 11 is pre-heated in the compartment 13 by the fumes arriving from the melting furnace 12, before being fed to the melting furnace 12 itself.

The second shutter device 21 simultaneously defines the lower wall of the intermediate chamber 17 and the upper wall of the compartment 13.

A third shutter device 22 defines the lower wall of the compartment 13 and selectively divides the latter from a coordinated part of the conveyor channel 23 below it of the transfer means 19.

In an advantageous variant, the second and third shutter devices 21, 22 are the cooled type.

Advantageously, an opening and closing movement of the third shutter device 22 allows to discharge, progressively and gradually, not instantaneously and therefore excessively violently, the metal charge 11 onto the conveyor channel 23 below it.

In particular, at the end of the pre-heating step, which for example can last about 4/6 minutes, the metal charge 11 is discharged by opening the third shutter device 22, onto the conveyor channel 23 below, to be moved to the melting furnace 12.

Furthermore, in another advantageous variant, weighing means 27 are provided, such as for example load cells, associated with the second shutter device 21 or the third shutter device 22, to weigh the metal charge 11 fed on each occasion when it is in the intermediate chamber 17 or the compartment 13, before being discharged onto the conveyor channel 23 below.

In particular, FIG. 2b shows, in a non-restrictive example of the present invention, one form of embodiment of the weighing means 27 for weighing the metal charge 11 when it is in the intermediate chamber 17. In this case, the weighing means 27 include load cells 28 associated with sliding guide supports, such as wheels 29, cooperating with the second shutter device 21.

The conveyor channel 23 is suitable to contain a plurality of loads of metal charge 11, so as to render the supply substantially continuous to the melting furnace 12.

In this case, the conveyor channel 23 is associated with a movement device 24, which determines the movement of the metal charge 11. For example, the movement device 24 can be the type with alternate motion or the vibrating type. In the case shown here by way of example, the movement device 24 determines the movement of the conveyor channel 23 and in FIGS. 2 and 4 the letter C indicates the retreat path of the conveyor channel 23 to exit from the melting furnace 12.

According to the present invention, the tower 14 is associated at the lower part and, in this case shown by way of example, laterally to a post-combustion chamber 25, which receives the fumes conveyed by the first pipe 26. The first pipe 26 has a second end 226 connected to the post-combustion chamber 25 in order to convey the fumes from the melting furnace 12 directly into the post-combustion chamber 25.

To this purpose the first pipe 26 is shaped with a first segment 26a, elbow-shaped downward, connected by means of a joint 50 to the melting furnace 12 from which it receives the fumes, a subsequent second segment 26b, rectilinear, to reach the lower base of the post-combustion chamber 25, and a third elbow-shaped segment 26c to connect to the post-combustion chamber 25.

The fumes are then conveyed from the bottom upward and directed from the post-combustion chamber 25 inside the compartment 13, where they pass through the metal charge 11 and heat it; they then exit through a second fume discharge pipe 41.

The post-combustion chamber 25 is disposed at the lower part of and at the side of the main body of the tower 14, and is preferably erected on the same support plane 30 as the latter, forming an independent unit, compact and rigid.

In particular, the post-combustion chamber 25 has a substantially vertical development and is sized to cause an expansion and slow-down of the entering fumes, as well as a partial cooling thereof.

In this way, the invention allows to define a desired and pre-determined flow-through or residence time of the fumes, possibly also adjustable, inside the post-combustion chamber 25 so that, combined with the temperature that is maintained in the post-combustion chamber 25, it is possible to substantially complete the combustion of the fumes, in particular of the carbon monoxide. This gives the advantage of drastically reducing, if not canceling, the risk of explosions inside the metal charge or in the fume discharge pipe.

Furthermore, thanks to the conformation of the post-combustion chamber 25 and its disposition adjacent to the tower 14 and below the compartment 13, the fumes are obliged to follow a path from the bottom upward, against the force of gravity. This flow of the fumes, from the bottom upward, together with the reduction in kinetic energy and the inertia of the fumes entering the post-combustion chamber 25, causes the sedimentation of the particulate and the powders contained therein which are therefore cleaner, advantageously in a step of the process that precedes the pre-heating step, to prevent any substances that can contaminate the metal charge 11 from entering into contact therewith. In this way, the post-combustion chamber 25 functions to all intents and purposes as a sedimentation chamber and fume depowdering chamber. All in all, therefore, the invention allows to pre-heat the metal charge 11 with fumes that are completely combusted, at a suitable temperature, for example about 800-900° C., and depowdered.

It is clear that the sizes of the post-combustion chamber 25 can vary, in relation to the speed of the fumes and the residence time of the fumes to be obtained inside it, depending on the various steel-making processes.

In particular, for example the post-combustion chamber 25 can be sized so that the residence time is comprised between about 1 and 2 seconds, to complete at least the combustion of the carbon monoxide to carbon dioxide.

In this case, the post-combustion chamber 25 is delimited by a lower entrance section 31, near the support frame 30, and an upper exit section 32.

The post-combustion process starts from the joint 50 to the melting furnace 12 and is completed substantially in correspondence with the exit section 32 (FIG. 3*b*) with a travel of the fumes along the segment of about 25-28 meters.

According to a first variant (FIGS. 2 and 3), the fumes are fed laterally to the compartment 13.

According to a second variant (FIGS. 4 and 5), the fumes are fed from below to the compartment 13.

In particular, in the first variant the fumes enter into contact with the metal charge 11 through a first lateral wall 34 of the compartment 13 which is shaped like a grid, defining a plurality of lateral apertures or compartments 33, suitable to allow the fumes to enter into it as they exit from the post-combustion chamber 25.

In a variant, the grid of the first lateral wall 34 is shaped with tines or teeth 37, inclined or with a conical development from the top downward, so as not to constrain or retain the scrap present in the compartment 13 (FIG. 2*a*).

In this case, in the first variant, the upper exit section 32 of the post-combustion chamber 25 is located in correspondence and communicating with the lateral apertures 33 (FIG. 3*b*).

The disposition of the entrance section 31 and the exit section 32 confers on the fumes a direction of flow from the bottom upward, along the post-combustion chamber 25.

In one form of embodiment, where the first pipe 26 enters into the post-combustion chamber 25, the width of the entrance section 31 is equal to about 4 times the diameter of the first pipe 26. To facilitate the stream of gases from the entrance section 31 to the exit section 32, and to prevent them losing an excessive quantity of energy, they pass through a first narrowing 38, positioned near the median zone of the post-combustion chamber 25, and a second narrowing 39, positioned in the immediate vicinity of the exit section 32.

After exiting from the post-combustion chamber 25, the fumes pass through the metal charge 11 in the compartment 13, heating it uniformly, and exit through an aperture 40 made in a second lateral wall 35 of the compartment 13, opposite the first lateral wall 34 and communicating with the fume discharge pipe 41. The aperture 40 is associated with a grid-type lateral wall 40*a*, analogous to the lateral wall 34 in the opposite position (FIG. 3*a*), which also, preferably, has conical grids, or with tines or teeth, inclined, to avoid retaining or blocking the scrap, which define other lateral apertures 40*b* through which the fumes can pass.

In particular, in the solution shown in FIGS. 2 and 3, in order to discharge the scrap into the conveyor channel 23, the third shutter device 22 is opened and, at the end of the discharge operation, it is consequently closed.

Figure 5:
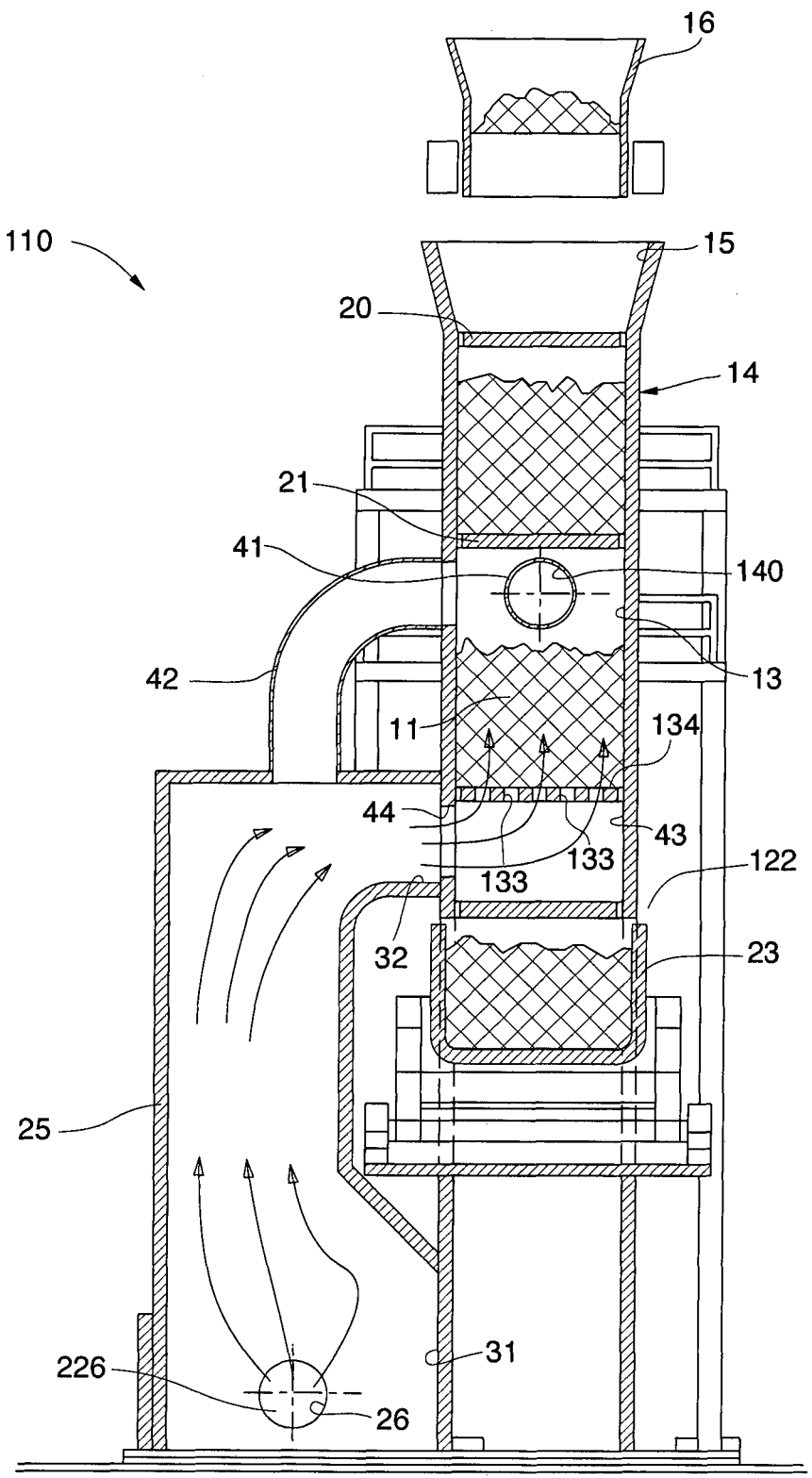
FIG. 5 is a variant of FIG. 3.

In the second variant, shown in FIGS. 4 and 5 and indicated by the reference number 110, the lateral wall 34 of the compartment 13 is not provided with lateral apertures 33 and moreover the lower wall of the compartment 13, indicated by the reference number 134, consists of a shutter device conformed substantially as a grid, where the grids preferably develop conically, or with tines or teeth 137, inclined (FIG. 4*a*), to define a plurality of lower apertures or compartments 133 for the passage of the fumes exiting from the post-combustion chamber 25. When it is closed, the shutter device 134 supports the metal charge 11 and is also selectively openable so as to progressively and gradually discharge the metal charge 11 onto the conveyor channel 23 below.

The apertures 133 put the compartment 13 into communication with a lower chamber 43 for the fumes to transit, positioned in the feeding and pre-heating tower 14 between the compartment 13 and the conveyor channel 23, from which it is selectively separated by means of a fourth mobile shutter device 122. The fumes, passing through a lateral aperture 44 connected to the exit section 32 of the post-combustion chamber 25, are then introduced into the lower chamber 43 and from here, passing through the shutter device 134 with grids, preferably conical, hit the metal charge 11 that is pre-heated, operating in counter-flow with respect to the stream of the metal charge 11 from the feed chamber 15 to the conveyor channel 23.

In this variant, the second fume discharge pipe 41 is connected to an aperture 140 made in the upper part of the second lateral wall 35 of the compartment 13, so as to allow the fumes to pass through the metal charge 11 in its entirety.

In particular, in the solution shown in FIGS. 4 and 5, in order to discharge the scrap into the conveyor channel 23, first the fourth shutter device 122 is opened and then the grid-type shutter device 134 is opened. At the end of the discharge operation, the closures are made in the inverse order, first closing the grid-type shutter device 134 and then the fourth shutter device 122.

In both forms of embodiment described above, there is a third bypass pipe 42 in which the fumes are made to pass, excluding the passage through the compartment 13, in those cases where there are problems in the passage of the fumes through the metal charge 11.

Furthermore, in both the solutions described above, by suitably coordinating the reciprocal movement of the first shutter device 20 and the second shutter device 21, it is possible to convey substantially all the fumes onto the metal charge 11 present in the compartment 13, so as to prevent, thanks to the coordinated closure of the first shutter device 20, part of the fumes from escaping upward through the feed chamber 15 when, opening the second shutter device 21, the metal charge 11 is discharged into the compartment 13.

It is clear that modifications and/or additions of parts may be made to the apparatus 10 as described heretofore, without departing from the field and scope of the present invention.

The invention claimed is:

1. An apparatus to feed and pre-heat a metal charge to a melting furnace of a steelworks, comprising a feeding and pre-heating tower separate, outside and autonomous from the melting furnace, wherein said feeding and pre-heating tower comprises a feed chamber located in its top part or head, inside which the metal charge arriving from a feed device is introduced, an intermediate chamber, located below the feed chamber and separated from it by a first separation device, and at least one compartment having lateral apertures able to cooperate at least with the exit of said post-combustion chamber and at least one lateral wall configured as a grid, disposed below said intermediate chamber and separated from it by a second separation device, to temporarily contain said metal charge, the apparatus also comprising transfer means to transfer said metal charge to said melting furnace and conveying means to convey the fumes exiting from the melting furnace to said compartment, wherein said apparatus also comprises a post-combustion chamber, disposed at least partly below said compartment, wherein said fume conveying means are connected, with a first end, to an exit hole of the melting furnace and with a second end to said post-combustion chamber, said post-combustion chamber being configured to determine the expansion of the fumes introduced by the conveying means and to direct said expanded fumes toward said compartment along a path from the bottom upward such as to determine a desired residence time of said fumes suitable to obtain at least the substantial complete combustion of the unburned gases present in said fumes.

2. The apparatus as in claim 1, characterized in that the post-combustion chamber is disposed adjacent to, that is, at the side and not directly below, the compartment of the tower that contains the metal charge to be discharged into the furnace.

3. The apparatus as in claim 1, characterized in that the post-combustion chamber is configured to determine a residence time of the fumes comprised between about 1 second and about 2 seconds.

4. The apparatus as in claim 1, characterized in that the compartment has at its lower part mobile shutter means which, in a closed condition, support the metal charge and which, in an open condition, allow it to be discharged toward said transfer means.

5. The apparatus as in claim 4, characterized in that said shutter means are configured to pass from the closed condition to the open condition so as to allow a gradual and progressive discharge of the metal charge from the compartment to the transfer means.

6. The apparatus as in claim 1, characterized in that the compartment has lower apertures able to cooperate with the exit of said post-combustion chamber.

7. The apparatus as in claim 6, characterized in that the compartment comprises at the lower part mobile shutter means which have said lower apertures and which, in a closed condition, support the metal charge and, in an open condition, allow the passage thereof toward said transfer means.

8. The apparatus as in claim 7, characterized in that said mobile shutter means are configured as grids which define said lower apertures.

9. The apparatus as in claim 1, characterized in that said post-combustion chamber comprises a lower entrance section connected to said fume conveying means, and an upper exit section connecting to said compartment.

10. The apparatus as in claim 9, characterized in that said entrance section has dimensions comprised between 2 and 5 times the cross section of said fume conveying means.

11. The apparatus as in claim 1, characterized in that said feeding and pre-heating tower comprises temporary separation means between said compartment and said transfer means, to supply pre-determinable discrete quantities of metal charge to said transfer means.

12. The apparatus as in claim 1, characterized in that said transfer means are configured to be driven in continuous advance, determining the continuous transfer of the quantities of metal charge supplied to it on each occasion.

13. The apparatus as in claim 1, characterized in that it comprises weighing means to weigh the metal charge.

14. The apparatus as in claim 13, characterized in that the weighing means are associated with said intermediate chamber or with said compartment.

15. The apparatus as in claim 14, characterized in that the weighing means comprise load cells associated with sliding guide supports, cooperating with said second shutter means.

16. A method to feed a metal charge to a melting furnace of a steelworks comprising an apparatus as in claim 1, which provides to temporarily contain said metal charge in a compartment of a feeding tower outside the melting furnace, to transfer said metal charge to said melting furnace and to convey the fumes exiting from the melting furnace to said compartment, characterized in that, before coming into contact with said metal charge, the fumes exiting from the melting furnace are conveyed to a lower part of the tower into a post-combustion chamber disposed below said compartment, in which a post-combustion step of the fumes is carried out which allows the expansion of the fumes introduced into the post-combustion chamber and directs said expanded fumes toward said compartment along a path such as to determine a desired residence time of said fumes suitable to obtain at least the substantial complete combustion of the unburned gases in said fumes.

17. The apparatus of claim 1 wherein at least two said walls of said compartment are configured as a grid.

* * * * *